United States Patent [19]
Waddell et al.

[11] Patent Number: 5,610,221
[45] Date of Patent: Mar. 11, 1997

[54] TIRE TREAD COMPOSITION COMPRISING HIGHLY REINFORCING REINFORCED AMORPHOUS PRECIPITATED SILICA

[75] Inventors: Walter H. Waddell, Pittsburgh; Larry R. Evans, Jeannette; Thomas G. Krivak, Irwin, all of Pa.

[73] Assignee: PPG Industries, Inc., Pittsburgh, Pa.

[21] Appl. No.: 533,808

[22] Filed: Sep. 26, 1995

Related U.S. Application Data

[63] Continuation of Ser. No. 170,474, Dec. 20, 1993, abandoned.

[51] Int. Cl.$^6$ ............................................. C08K 3/00
[52] U.S. Cl. ........................ 524/492; 524/493; 524/495; 524/496
[58] Field of Search .................................. 524/492, 493, 524/495, 496

[56] References Cited

U.S. PATENT DOCUMENTS

| | | | |
|---|---|---|---|
| 2,821,232 | 1/1958 | Wolf | 152/330 |
| 2,831,828 | 4/1958 | Brooks et al. | 260/41.5 |
| 2,831,829 | 4/1958 | Brooks et al. | 260/41.5 |
| 3,014,883 | 12/1961 | Wolf | 260/33.6 |
| 3,141,004 | 7/1964 | Wolf | 260/41.5 |
| 3,203,819 | 8/1965 | Steenken et al. | 106/307 |
| 3,317,458 | 5/1967 | Clas et al. | 260/41.5 |
| 3,451,458 | 6/1969 | Steuber | 152/330 |
| 3,622,650 | 11/1971 | Berstein et al. | 260/763 |
| 3,664,403 | 5/1972 | Doran et al. | 152/330 |
| 3,737,334 | 6/1973 | Doran et al. | 106/288 |
| 3,738,948 | 6/1973 | Dunnom | 260/3 |
| 3,746,669 | 7/1973 | Dunnom et al. | 260/3 |
| 3,768,537 | 10/1973 | Hess et al. | 152/330 |
| 3,814,160 | 6/1974 | Creasey | 152/330 |
| 3,881,536 | 5/1975 | Doran, Jr. | 152/330 |
| 3,884,285 | 5/1975 | Russell et al. | 152/33 OR |
| 3,938,574 | 2/1976 | Burmester et al. | 152/330 R |
| 3,994,742 | 11/1976 | Russell et al. | 106/288 Q |
| 4,519,430 | 5/1985 | Ahmad et al. | 152/209 |
| 4,530,959 | 7/1985 | Armbruster et al. | 524/526 |
| 4,590,052 | 5/1986 | Chevallier et al. | 423/335 |
| 4,616,065 | 10/1986 | Hargis et al. | 525/99 |
| 4,708,859 | 11/1987 | Chevallier | 423/339 |
| 4,748,199 | 5/1988 | Takaiguchi et al. | 524/318 |
| 4,820,751 | 4/1989 | Takeshita et al. | 523/215 |
| 4,866,131 | 9/1989 | Fujimski et al. | 525/96 |
| 4,874,594 | 11/1989 | Chevallier | 423/335 |
| 4,894,420 | 1/1990 | Scriver | 525/237 |
| 4,925,894 | 5/1990 | Futamura | 524/484 |
| 5,082,901 | 1/1992 | Linster | 525/237 |
| 5,088,537 | 2/1992 | Kan et al. | 152/525 |
| 5,089,554 | 2/1992 | Bomo et al. | 524/493 |
| 5,094,829 | 3/1992 | Krivak et al. | 423/339 |
| 5,162,409 | 11/1992 | Mroczkowski et al. | 524/262 |
| 5,227,425 | 7/1993 | Rauline | 524/493 |
| 5,504,137 | 3/1996 | Sandstrom | 524/492 |

FOREIGN PATENT DOCUMENTS

| | | |
|---|---|---|
| 1117/92 | 8/1992 | Australia . |
| 594065 | 3/1960 | Canada . |
| 599402 | 6/1960 | Canada . |
| 649944 | 10/1962 | Canada . |
| 668690 | 8/1963 | Canada . |
| 873924 | 6/1971 | Canada . |
| 501227A1 | 2/1992 | European Pat. Off. . |
| 527396A1 | 7/1992 | European Pat. Off. . |
| 841156 | 10/1956 | United Kingdom . |
| 932525 | 12/1961 | United Kingdom . |
| 921810 | 12/1961 | United Kingdom . |

OTHER PUBLICATIONS

S. Futamura, "Deformation Index—Concept For Hysteretic Energy–Loss Process", Rubber and Chemistry Technology, vol. 64, pp. 57–64.

S. Futamura, "Effect of Material Properties on Tire Performance Characteristics—Part II, Tread Material$^2$" presented at the sixth annual meeting of the Tire Society at The University of Akron, Akron, OH, Mar. 24–25, pp. 2–12.

*Primary Examiner*—Edward J. Cain
*Attorney, Agent, or Firm*—Irwin M. Stein; George D. Morris

[57] ABSTRACT

Cured tread rubber compositions of tires contain cured organic rubber, from 40 to 150 phr of reinforcing carbon black, and reinforcing reinforced amorphous precipitated silica wherein the silica has a surface area of from 160 to 340 m$^2$/g and a pore diameter at the maximum of the volume pore size distribution function of from 5 to 19 nm. The presence of such reinforcing silica provides improved tire performance characteristics, especially improved paved highway performance, to tires having treads of the cured tread rubber compositions.

21 Claims, No Drawings

TIRE TREAD COMPOSITION COMPRISING HIGHLY REINFORCING REINFORCED AMORPHOUS PRECIPITATED SILICA

This is a continuation of application Ser. No. 08/170,474, filed Dec. 20, 1993, now abandoned.

A tire is a composite of many rubbery components, each of which serves a specific and unique function. For example, the tread is the wear-resistant component of a tire which comes into contact with the road; tread compositions are therefore formulated for high abrasion resistance, high dry traction, high wet traction, high ice traction, good speed stability, and good casing protection. Sidewalls primarily control ride and support; consequently sidewall compositions are formulated for resistance to weathering, ozone attack, abrasion, tear, and radial and circumferential cracking, and for good fatigue life. Shoulder wedges are placed under the edge of the belt to reduce interply shear strain at the belt edge; shoulder wedge compositions are therefore formulated for high dynamic stiffness, good adhesion, high resistance to fatigue, and high resistance to tear. The base is a rubber composition which is placed between the bottom of the nonskid grooves and the carcass; base compositions are formulated for low hysteresis, good adhesion, fatigue and tear resistance, and high durability. The cushion is a rubber composition placed between the tread and belt or between the tread base and belt; cushion compositions are formulated to give good adhesion, low heat buildup, good fatigue resistance, good age resistance, and compatibility with the tread composition. The apex is a rubber wedge located in the lower sidewall region above the bead; it is bonded to and encased by the plies (and chipper, if present) and provides rigidity to the lower sidewall for bending durability and lateral stiffness. Apex compositions are formulated for good dynamic stiffness, flex fatigue, tear strength, adhesion, and durability. The liner is a thin layer of rubber composition laminated to the inside of a tubeless tire to ensure retention of compressed air; liner compositions are formulated to provide good air and moisture impermeability, high flex-fatigue resistance, and good durability. There are, in addition to the foregoing, several rubber compositions used to provide adhesion between one or more of the major rubber components and one or more of the mechanical components such as belts, cords, strands, and fabrics. Because the demands placed on the various rubbery components are in many ways very different, a single rubbery composition is not acceptable for all purposes in a modern pneumatic tire; rather each composition is separately formulated to meet requirements which are in many ways quite different.

Silica has been used as a reinforcing pigment, in combination with reinforcing carbon black in the tread portions of tires. See, for example, U.S. Pat. Nos. 3,203,819; 3,451,458; 3,664,403; 3,737,334; 3,746,669; 3,814,160; 3,768,537; 3,881,536; 3,884,285; 3,994,742 and 5,227,425.

It has now been discovered that the presence of highly reinforcing reinforced amorphous precipitated silica, such as described in U.S. Pat. No. 5,094,829, in cured tread rubber compositions, results in improved tire performance characteristics, especially improved paved highway performance, of tires having treads of such tread rubber compositions. Examples of such performance characteristics include rolling resistance, wet grip traction, and dry grip traction as described, for example, in U.S. Pat. No. 4,925,894. More specifically, it has been discovered that the presence of the highly reinforcing reinforced amorphous precipitated silica usually imparts improved cornering coefficients and often imparts improved wet traction. It has also been discovered (1) that the surface area of reinforcing reinforced amorphous precipitated silica used in organic rubber tire tread compositions may be somewhat lower than the 220 $m^2/g$ stated in the patent without unduly sacrificing the improved performance realized through use of the invention, and (2) the value of the total intruded volume has little effect on highway performance. Although U.S. Pat. No. 5,094,829 does state (column 2, lines 19–23) that the reinforced precipitated silicas therein described may be used as reinforcing fillers for styrene-butadiene rubber and other organic rubbers, the patent does not (1) discuss organic rubber tires, (2) distinguish between the various different organic rubber compositions of a tire, or (3) disclose any benefit to be obtained by employing the reinforced precipitated silica in organic rubber tire treads.

Accordingly, in a tire comprising: (a) carcass having a crown; and (b) cured tread rubber composition adhered to the crown of the carcass; the invention is the improvement wherein the cured tread rubber composition comprises in combination: (c) organic rubber; (d) from 40 to 150 phr of reinforcing carbon black; and (e) reinforcing reinforced amorphous precipitated silica wherein the reinforcing reinforced amorphous precipitated silica has a surface area of from 160 to 340 $m^2/g$ and a pore diameter at the maximum of the volume pore size distribution function of from 5 to 19 nm.

The reinforcing reinforced amorphous precipitated silica can be used in the presence of appropriate ratios of a suitable silane coupling agent as is described, for example, in U.S. Pat. Nos. 4,519,430; 4,820,751; 5,227,425; and 5,162,409. However, it has also surprisingly been discovered that, while silane coupling agent may be present in the tire tread composition, further improved results may be obtained if the tire tread composition is substantially free of silane coupling agent. Indeed, improved results can be obtained if the tire tread composition is substantially free of coupling agent irrespective of type. In view of the hydrophobic nature of the tire tread composition and the hydrophilic nature of amorphous precipitated silica, this further improvement is quite unexpected. The absence of a coupling agent is significantly advantageous not only because of improved performance, but also because of the significant savings in cost realized.

The cured tread rubber compositions used in the present invention may be specifically formulated for use in high performance applications such as those described in U.S. Pat. No. 4,866,131.

As used herein and in the claims, the carcass comprises all parts of a tire except the cured tread rubber composition and, if present, one or more intervening adhesive layers and/or a base layer. The cured tread rubber composition may be adhered to the crown of the carcass directly, that is, in the absence of one or more intervening adhesive layers and/or a base layer. Alternatively, the cured tread rubber composition may be adhered to the crown of the carcass via one or more intervening adhesive layers and/or a base layer. Such constructions are themselves (but not the improvement of the present invention) well known in the art.

A wide variety of organic rubbers and mixtures thereof are suitable for normal use in the tire tread compositions employed in the invention. Examples of such organic rubbers include natural rubber; cis-1,4-polyisoprene; cis-1,4-polybutadiene; trans-1,4-polybutadiene; 1,2-polybutadiene; co-(styrene-butadiene) composed of various percentages of styrene and the varying microstructures of polybutadiene just denoted; acrylonitrile-based rubber compositions; and isobutylene-based rubber compositions; or a mixture thereof, as described in for example U.S. Pat. Nos. 4,530, 959; 4,616,065; 4,748,199; 4,866,131; 4,894,420; 4,925,894; 5,082,901; and 5,162,409.

The amount of organic rubber present in the cured tread rubber composition may vary widely. In most instances organic rubber constitutes from 20 to 70 percent by weight of the cured tread rubber composition. Often organic rubber constitutes from 30 to 65 percent by weight of the cured tread rubber composition. From 37 to 60 percent by weight is preferred. The proportion of organic rubber used in preparing the uncured tire tread composition is substantially the same as that present in the cured tread rubber composition.

Any of the reinforcing carbon blacks customarily used in rubber compositions may be used in the cured tread rubber compositions. A single reinforcing carbon black or a mixture of different reinforcing carbon blacks may be used. The proportion of reinforcing carbon black used in preparing the uncured tire tread composition is substantially the same as that present in the cured tread rubber composition.

The reinforcing carbon black constitutes from 40 to 150 parts per hundred parts by weight of the rubber (phr) of the cured tread rubber composition. Frequently, the reinforcing carbon black constitutes from 45 to 120 phr of the cured tread rubber composition. Often the reinforcing carbon black constitutes from 50 to 90 phr of the cured tread rubber composition.

Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15–29, 172–176, 218–233, 364–365, 462–465, 554–564, and 578–579, the entire disclosures of which are incorporated herein by reference. Silica gel is usually produced commercially at low pH by acidifying an aqueous solution of a soluble metal silicate, customarily sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and/or carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmett, Teller (BET) method using nitrogen as the adsorbate, is often lower than that of silica gel.

Variations in the parameters and/or conditions during production result in variations in the types of precipitated silicas produced. Although they are all broadly precipitated silicas, the types of precipitated silicas often differ significantly in physical properties and sometimes in chemical properties. These differences in properties are important and often result in one type being especially useful for a particular purpose but of marginal utility for another purpose, whereas another type is quite useful for that other purpose but only marginally useful for the first purpose.

Reinforcement of precipitated silica, that is, the deposition of silica on aggregates of previously precipitated silica, is itself known. It has been found, however, that by controlling the conditions of silica precipitation and multiple reinforcement steps, silicas may be produced having properties that make them especially useful for reinforcing organic rubbers.

Although it is not desired to be bound by any theory, it is believed that as precipitated silica is dried, the material shrinks; consequently, pore diameters are reduced, surface area is reduced, and the void volume is reduced. It is further believed that by sufficiently reinforcing the silica prior to drying, a more open structure is obtained after drying. Irrespective of theory, the reinforcing reinforced amorphous precipitated silica used in the present invention has, on balance, large pore diameters and a large total intruded volume for the surface area obtained. Among the reinforcing reinforced amorphous precipitated silicas that can be used, are those described in U.S. Pat. No. 5,094,829. It has been found, however, that using potassium silicate as a replacement for some or all of the sodium silicate can result in the production of reinforcing reinforced amorphous precipitated silica of lower surface area.

The reinforcing reinforced amorphous precipitated silicas employed in the present invention are characterized as "reinforcing" because they reinforce cured rubber compositions. They are characterized as "reinforced" because they are reinforced during silica preparation as described above.

Reinforcing reinforced amorphous precipitated silica having, on a coating-free and impregnant-free basis, a surface area of from 160 to 340 square meters per gram ($m^2/g$) and a pore diameter at the maximum of the volume pore size distribution function of from 5 to 19 nanometers (nm) may be produced by a process comprising: (a) establishing an initial aqueous alkali metal silicate solution containing from 0.5 to 4 weight percent $SiO_2$ and having an $SiO_2:M_2O$ molar ratio of from 1.6 to 3.9; (b) over a period of at least 20 minutes and with agitation, adding acid to the initial aqueous alkali metal silicate solution at a temperature below 50° C. to neutralize at least 60 percent of the $M_2O$ present in the initial aqueous alkali metal solution and thereby to form a first reaction mixture; (c) over a period of from 115 to 240 minutes, with agitation, and at a temperature of from 80° C. to 95° C., substantially simultaneously adding to the first reaction mixture: (1) additive aqueous alkali metal silicate solution, and (2) acid, thereby to form a second reaction mixture wherein the amount of the additive aqueous alkali metal silicate solution added is such that the amount of $SiO_2$ added is from 0.5 to 2 times the amount of $SiO_2$ present in the initial aqueous alkali metal silicate solution established in step (a) and wherein the amount of the acid added is such that at least 60 percent of the $M_2O$ contained in the additive aqueous alkali metal silicate solution added during the simultaneous addition is neutralized; (d) adding acid to the second reaction mixture with agitation at a temperature of from 80° C. to 95° C. to form a third reaction mixture having a pH below 9; (e) aging the third reaction mixture with agitation at a pH below 9 and at a temperature of from 80° C. to 95° C. for a period of from 1 to 120 minutes; (f) with agitation and at a temperature of from 80° C. to 95° C., adding to the aged third reaction mixture additive aqueous alkali metal silicate solution to form a fourth reaction mixture having a pH of from 7.5 to 9; (g) forming a fifth reaction mixture by adding to the fourth reaction mixture with agitation and at a temperature of from 80° C. to 95° C., a further quantity of additive aqueous alkali metal silicate solution and adding acid as necessary to maintain the pH at from 7.5 to 9 during the addition of the further quantity of the additive aqueous alkali metal silicate solution, wherein: (1) the amount of the additive aqueous alkali metal silicate solution added in steps (f) and (g) is such that the amount of $SiO_2$ added in steps (f) and (g) is from 0.05 to 0.75 times the amount of $SiO_2$ present in the third reaction mixture, and (2) the additive aqueous alkali metal silicate solution is added in steps (f) and (g) over a collective period of at least 40 minutes; (h) aging the fifth reaction mixture with agitation at a temperature of from 80° C. to 95° C. for a period of from 5 to 60 minutes; (i) adding acid to the aged fifth reaction mixture with agitation at a temperature of from 80° C. to 95° C. to form a sixth reaction mixture having a pH below 7; (j) aging the sixth reaction mixture with agitation at a pH below 7 and at a temperature of from 80° C. to 95° C. for a period of at least 1 minute; (k) separating reinforced precipitated silica from most of the liquid of the aged sixth reaction mixture; (l) washing the separated reinforced precipitated silica with water; and (m) drying the washed reinforced precipitated silica, wherein: (n) the alkali metal silicate is lithium silicate, sodium silicate, potassium silicate, or a mixture thereof; and (o) M is lithium, sodium, potassium, or a mixture thereof.

Optionally, prior to step (c) the first reaction mixture is aged with agitation at a temperature of from 30° C. to 95° C. for a period of from 5 to 180 minutes.

The composition of the initial aqueous alkali metal silicate solution established in step (a) may vary widely. Generally the initial aqueous alkali metal silicate solution comprises from 0.5 to 4 weight percent $SiO_2$. In many cases the initial aqueous alkali metal silicate solution comprises from 1 to 3 weight percent $SiO_2$. From 1.5 to 2.5 weight percent $SiO_2$ is preferred. Usually the initial aqueous alkali metal silicate solution has an $SiO_2$:$M_2O$ molar ratio of from 1.6 to 3.9. Often the $SiO_2$:$M_2O$ molar ratio is from 2.5 to 3.6. Preferably the $SiO_2$:$M_2O$ molar ratio is from 2.9 to 3.6. Frequently the $SiO_2$:$M_2O$ molar ratio is from 3.2 to 3.3.

The composition of the additive aqueous alkali metal silicate solution may also vary widely. Usually the additive aqueous alkali metal silicate solution comprises from 2 to 30 percent by weight $SiO_2$. Often the additive aqueous alkali metal silicate solution comprises from 10 to 15 percent by weight $SiO_2$. From 12 to 13 weight percent $SiO_2$ is preferred. Frequently the additive aqueous alkali metal silicate solution has an $SiO_2$:$M_2O$ molar ratio of from 1.6 to 3.9. In many cases the $SiO_2$:$M_2O$ molar ratio is from 2.5 to about 3.6. Preferably the $SiO_2$:$M_2O$ molar ratio is from 2.9 to 3.6. Often the $SiO_2$:$M_2O$ molar ratio is from 3.2 to 3.3. Additive aqueous alkali metal silicate solution having the same composition may be used throughout the various silicate additions, or additive aqueous alkali metal silicate solutions having differing compositions may be used in different silicate addition steps.

The acid used in the process may also vary widely. In general, the acid added in steps (b), (c), and (g) should be strong enough to neutralize alkali metal silicate and cause precipitation of silica. The acid added in steps (d) and (i) should be strong enough to reduce the pH to desired values within the specified ranges. The acid used in the various acid addition steps may be the same or different, but preferably it is the same. A weak acid such as carbonic acid produced by the introduction of carbon dioxide to the reaction mixture may be used for precipitation of silica, but a stronger acid must be used in steps (d) and (i) when it is desired to reduce the pH to values below 7. It is preferred to use strong acid throughout the process. Examples of the strong acids include sulfuric acid, hydrochloric acid, nitric acid, phosphoric acid, and acetic acid. The strong mineral acids such as sulfuric acid, hydrochloric acid, nitric acid, and phosphoric acid are preferred; sulfuric acid is especially preferred.

The acid addition of step (b) is made over a period of at least 20 minutes. Frequently the acid addition of step (b) is made over a period of from 20 to 60 minutes. From 26 to 32 minutes is preferred.

The temperature of the reaction mixture during the acid addition of step (b) is below 50° C. From 30° C. to 40° C. is preferred.

At least 60 percent of the $M_2O$ present in the initial aqueous alkali metal silicate solution is neutralized during the acid addition of step (b). As much as 100 percent of the $M_2$) may be neutralized if desired. Preferably from 75 to 85 percent of the $M_2O$ is neutralized.

The additions made in step (c) are made over a period of from 115 to 240 minutes. Preferably the additions are made over a period of from 115 to 125 minutes.

The temperature of the reaction mixture during the additions of step (c) is from 80° C. to 95° C. From 90° C. to 95° C. is preferred.

In step (c), the amount of additive aqueous alkali metal silicate added is such that the amount of $SiO_2$ added is from 0.5 to 2 times the amount of $SiO_2$ present in the initial aqueous alkali metal silicate solution established in step (a). From 0.9 to 1.1 times the $SiO_2$ present in the initial aqueous alkali metal silicate solution is preferred.

The amount of acid added in step (c) is such that at least 60 percent of the $M_2O$ contained in the additive aqueous alkali metal silicate solution added in step (c) is neutralized. As much as 100 percent of such $M_2O$ may be neutralized if desired. Preferably from 75 to 85 percent of the $M_2O$ is neutralized.

The temperature of the reaction mixture during the acid addition of step (d) is from 80° C. to 95° C. From 90° C. to 95° C. is preferred.

In step (d), the acid is added such that the pH of the third reaction mixture is below 9. Often the pH is from 2.5 to below 9. A pH of from 4 to 8.9 is preferred.

Similarly, the third reaction mixture is aged in step (e) at a pH below 9. Often the pH is from 2.5 to below 9. A pH of from 4 to 8.9 is preferred.

The temperature of the third reaction mixture during the aging of step (e) is from 80° C. to 95° C. From 90° C. to 95° C. is preferred.

The aging in step (e) is for a period of from 1 to 120 minutes. In many cases the third reaction mixture is aged for a period of from 15 to 120 minutes. A period of from 15 to 30 minutes is preferred.

The temperature of the reaction mixture during the addition of additive aqueous alkali metal silicate solution in step (f) is from 80° C. to 95° C. From 90° C. to 95° C. is preferred.

The pH of the fourth reaction mixture formed in step (f) is from 7.5 to 9. A pH of from 8 to 9 is preferred.

Acid is added in step (g) as necessary to maintain the pH of the reaction mixture at from 7.5 to 9 during the addition of the further quantity of additive aqueous alkali metal silicate solution. A pH of from 8 to 9 is preferred.

The amount of additive aqueous alkali metal silicate solution added in steps (f) and (g) is such that the amount of $SiO_2$ added in steps (f) and (g) is from 0.05 to 0.75 times the amount of $SiO_2$ present in the third reaction mixture. Preferably the amount of additive aqueous alkali metal silicate solution added in steps (f) and (g) is such that the amount of $SiO_2$ added in steps (f) and (g) is from 0.25 to 0.6 times the amount of $SiO_2$ present in the third reaction mixture.

The additive alkali metal silicate solution is added in steps (f) and (g) over a collective period of at least 40 minutes. A collective period of from 40 to 240 minutes is often employed. A collective period of from 70 to 100 minutes is preferred.

The temperature of the fifth reaction mixture during the aging of step (h) is from 80° C. to 95° C. From 90° C. to 95° C. is preferred.

In step (h), the fifth reaction mixture is aged for a period of from 5 to 60 minutes. A period of from 30 to 60 minutes is preferred.

The temperature of the reaction mixture during the acid addition of step (i) is from 80° C. to 95° C. From 90° C. to 95° C. is preferred.

In step (i), the acid is added such that the pH of the sixth reaction mixture is below 7. Often the pH is from 2.5 to below 7. A pH of from 4 to 5 is preferred.

The sixth reaction mixture is aged in step (j) at a pH below 7. In many cases the pH is from 2.5 to below 7. A pH of from 4 to 5 is preferred.

The temperature of the sixth reaction mixture during the aging of step (j) is from 80° C. to 95° C. From 90° C. to 95° C. is preferred.

In step (j), the sixth reaction mixture is aged for a period of at least 1 minute. Often the aging period is at least 30 minutes. An aging period of at least 50 minutes is preferred.

The separation of step (k) may be accomplished by one or more techniques for separating solids from liquid such as, for example, filtration, centrifugation, decantation, and the like.

The washing of step (l) may be accomplished by any of the procedures known to the art for washing solids. Examples of such procedures include passing water through a filter cake, and reslurring the reinforced precipitated silica in water followed by separating the solids from the liquid. One washing cycle or a succession of washing cycles may be employed as desired. The primary purpose of washing is to remove salt formed by the various neutralizations to desirably low levels. Usually the reinforced precipitated silica is washed until the concentration of salt in the dried reinforced precipitated silica is less than or equal to 2 percent by weight. Preferably the reinforced precipitated silica is washed until the concentration of salt is less than or equal to 0.7 percent by weight.

The drying of step (m) may also be accomplished by one or more known techniques. For example, the reinforced precipitated silica may be dried in an air oven or in a vacuum oven. Preferably the reinforced precipitated silica is dispersed in water and spray dried in a column of hot air. The temperature at which drying is accomplished is not critical, but the usual practice is to employ temperatures of at least 70° C. Generally the drying temperature is less than 700° C. In most cases drying is continued until the reinforced precipitated silica has the characteristics of a powder. Ordinarily the dried reinforced precipitated silica is not absolutely anhydrous but contains bound water (from 2 to 5 weight percent) and adsorbed water (from 1 to 7 weight percent) in varying amounts, the latter depending partly upon the prevailing relative humidity. Adsorbed water is that water which is removed from the silica by heating at 105° C. for 24 hours at atmospheric pressure in a laboratory oven. Bound water is that water which is removed by additionally heating the silica at calcination temperatures, for example, from 1000° C. to 1200° C.

The degrees of agitation used in the various steps of the invention may vary considerably. The agitation employed during the addition of one or more reactants should be at least sufficient to provide a thorough dispersion of the reactants and reaction mixture so as to avoid more than trivial locally high concentrations of reactants and to ensure that silica deposition occurs substantially uniformly thereby avoiding gellation on the macro scale. The agitation employed during aging should be at least sufficient to avoid settling of solids to ensure that silica deposition occurs substantially uniformly throughout the mass of silica particles rather than preferentially on those particles at or near the top of a settled layer of particles. The degrees of agitation may, and preferably are, greater than these minimums. In general, vigorous agitation is preferred.

A preferred embodiment of a process for producing reinforced amorphous precipitated silica having, on a coating-free and impregnant-free basis, a surface area of from 160 to 340 m²/g and a pore diameter at the maximum of the volume pore size distribution function of from 5 to 19 nm, is the process comprising: (a) establishing an initial aqueous alkali metal silicate solution containing from 0.5 to 4 weight percent $SiO_2$ and having an $SiO_2:M_2O$ molar ratio of from 1.6 to 3.9; (b) over a period of at least 20 minutes and with agitation, adding acid to the initial aqueous alkali metal silicate solution at a temperature of from 30° C. to 40° C. to neutralize from 75 to 85 percent of the $M_2O$ present in the initial aqueous alkali metal solution and to form a first reaction mixture; (c) over a period of from 115 to 125 minutes, with agitation, and at a temperature of from 90° C. to 95° C., substantially simultaneously adding to the first reaction mixture: (1) additive aqueous alkali metal silicate solution, and (2) acid, to form a second reaction mixture wherein the amount of the additive aqueous alkali metal silicate solution added is such that the amount of $SiO_2$ added is from 0.9 to 1.1 times the amount of $SiO_2$ present in the initial aqueous alkali metal silicate solution established in step (a) and wherein the amount of the acid added is such that from 75 to 85 percent of the $M_2O$ contained in the additive aqueous alkali metal silicate solution added during the simultaneous addition is neutralized; (d) adding acid to the second reaction mixture with agitation at a temperature of from 90° C. to 95° C. to form a third reaction mixture having a pH of from 4 to 9; (e) aging the third reaction mixture with agitation at a temperature of from 90° C. to 95° C. for a period of from 15 to 30 minutes; (f) with agitation and at a temperature of from 90° C. to 95° C., adding to the aged third reaction mixture additive aqueous alkali metal silicate solution to form a fourth reaction mixture having a pH of from 8 to 9; (g) forming a fifth reaction mixture by adding to the fourth reaction mixture with agitation and at a temperature of from 90° C. to 95° C., a further quantity of additive aqueous alkali metal silicate solution and adding acid as necessary to maintain the pH at from 8 to 9 during the addition of the further quantity of the additive aqueous alkali metal silicate solution, wherein: (1) the amount of the additive aqueous alkali metal silicate solution added in steps (f) and (g) is such that the amount of $SiO_2$ added in steps (f) and (g) is from 0.25 to 0.6 times the amount of $SiO_2$ present in the third reaction mixture, and (2) the additive aqueous alkali metal silicate solution is added in steps (f) and (g) over a collective period of from 70 to 100 minutes; (h) aging the fifth reaction mixture with agitation at a temperature of from 90° C. to 95° C. for a period of from 30 to 60 minutes; (i) adding acid to the aged fifth reaction mixture with agitation at a temperature of from 90° C. to 95° C. to form a sixth reaction mixture having a pH of from 4 to 5; (j) aging the sixth reaction mixture with agitation at a temperature of from 90° C. to 95° C. for a period of at least 50 minutes; (k) separating reinforced precipitated silica from most of the liquid of the aged sixth reaction mixture; (l) washing the separated reinforced precipitated silica with water; and (m) drying the washed reinforced precipitated silica, wherein: (n) the alkali metal silicate is lithium silicate, sodium silicate, potassium silicate, or a mixture thereof; and (o) M is lithium, sodium, potassium, or a mixture thereof.

It is understood that one or more ranges in the preferred embodiment may be used in lieu of the corresponding broader range or ranges in the broader description of the process.

As used in the present specification and claims, the surface area of the reinforcing reinforced amorphous precipitated silica is the surface area determined by the Brunauer, Emmett, Teller (BET) method according to ASTM C 819-77 using nitrogen as the adsorbate but modified by outgassing the system and the sample for one hour at 180° C. The surface area is from 160 to 340 $m^2/g$. In many cases the surface area is from 180 to 340 $m^2/g$. From 200 to 340 $m^2/g$ is preferred.

The volume average pore size distribution function of the reinforcing reinforced amorphous precipitated silica is determined by mercury porosimetry using an Autoscan mercury porosimeter (Quantachrome Corp.) in accordance with the accompanying operating manual. In operating the porosimeter, a scan is made in the high pressure range (from 103 kilopascals absolute to 227 megapascals absolute). The volume pore size distribution function is given by the following equation:

$$D_v(d) = \frac{P}{d} \frac{dV}{dP}$$

where:

$D_v(d)$ is the volume pore size distribution function, usually expressed in $cm^3/(mm \cdot g)$;

d is the pore diameter, usually expressed in nm;

P is the pressure, usually expressed in pounds per square inch, absolute; and

V is the pore volume per unit mass, usually expressed in $cm^3/g$.

$D_v(d)$ is determined by taking $\Delta V/\Delta P$ for small values of $\Delta P$ from either a plot of V versus P or preferably from the raw data. Each value of $\Delta V/\Delta P$ is multiplied by the pressure at the upper end of the interval and divided by the corresponding pore diameter. The resulting value is plotted versus the pore diameter. The value of the pore diameter at the maximum of the volume pore size distribution function is then taken from the plotted graph. Numerical procedures may be used rather than graphical when desired. For the reinforcing reinforced amorphous precipitated silica used in the present invention the pore diameter at the maximum of the volume pore size distribution function is from 5 to 19 nm. Preferably the pore diameter at the maximum of the function is from 8 to 18 nm.

The ultimate particle size of the reinforcing reinforced amorphous precipitated silica may be widely varied. Usually the average ultimate particle size (irrespective of whether or not the ultimate particles are agglomerated) is less than 0.1 micrometer as determined by transmission electron microscopy. Often the average ultimate particle size is less than 0.05 micrometer. Preferably the average ultimate particle size of the reinforcing reinforced amorphous precipitated silica is less than 0.03 micrometer.

The reinforcing reinforced amorphous precipitated silica used in the present invention is particulate. As present in the cured tread rubber composition, the reinforcing reinforced amorphous precipitated silica particles may be in the form of ultimate particles, aggregates of ultimate particles or a combination of both. In most cases, at least 90 percent by weight of the reinforcing reinforced amorphous precipitated silica used in preparing the cured tread rubber composition has gross particle sizes in the range of from 1 to 40 micrometers as determined by use of a Model TAII Coulter Counter® (Coulter Electronics, Inc.) according to ASTM C 690-80 but modified by stirring the filler for 10 minutes in Isoton® II electrolyte (Curtin Matheson Scientific, Inc.) using a four-blade, 4.445 centimeter diameter propeller stirrer. Preferably at least 90 percent by weight of the reinforcing reinforced amorphous precipitated silica has gross particle sizes in the range of from 5 to 30 micrometers. It is expected that the sizes of filler agglomerates may be reduced during processing of the ingredients to prepare the cured tread rubber composition. Accordingly, the distribution of gross particle sizes in the cured tread rubber composition may be smaller than in the raw reinforcing reinforced amorphous precipitated silica itself.

The neutralization of alkali metal silicate with acid to produce the reinforcing reinforced amorphous precipitated silica used in the invention also produces alkali metal salt of the acid(s) used for neutralization as by-product. It is preferred that the amount of such salt s associated with the reinforcing reinforced amorphous precipitated amorphous precipitated silica product be low. When the reinforced amorphous precipitated silica is separated from the liquid of the aged sixth reaction mixture, most of the salt is removed with the liquid. Further amounts of salt may conveniently be removed by washing the separated reinforced amorphous precipitated silica with water. In general, the greater the amount of water used for washing, the lower will be the salt content of the final dried product. It is usually preferred that reinforcing reinforced amorphous precipitated silica contain less than 1 percent by weight alkali metal salt. It is often particularly preferred that the reinforcing reinforced amorphous precipitated silica contain less than 0.7 percent by weight alkali metal salt.

The amount of reinforcing reinforced amorphous precipitated silica present in the cured tread rubber composition may vary widely. In most instances the reinforcing reinforced amorphous precipitated silica constitutes from 5 to 40 phr of the cured tread rubber composition. Often the reinforcing reinforced amorphous precipitated silica constitutes from 7 to 30 phr of the cured tread rubber composition. Preferably the reinforcing reinforced amorphous precipitated silica constitutes from 10 to 25 phr of the cured tread rubber composition.

There are many other materials which are customarily and/or optionally present in the cured tread rubber composition. These include such materials as vulcanizing agent (usually, but not necessarily, sulfur), accelerator, lubricant, wax, antioxidant, semi-reinforcing carbon black, non-reinforcing carbon black, other pigment, stearic acid, and/or zinc oxide. The listing of such materials is by no means exhaustive. These and other ingredients may be employed in their customary amounts for their customary purposes so long as they do not seriously interfere with good rubber tire tread formulating practice.

The curable tire tread composition may be formed from the ingredients in any manner known to the art. Mixing and milling are most commonly used. Similarly, a tire may be built, molded, and cured using the curable tire tread composition according to any of the general methods and techniques known to the art. In the region where the sidewall and tread are joined, the structure is usually tread over sidewall (TOS) or sidewall over tread (SWOT). The TOS structure is characterized by a peripheral inside face of the tread rubber being adhered to the outside face of the upper end portion of the sidewall. The SWOT structure is characterized by the inside face of the upper end portion of the sidewall being in close connection with a side face of the tread rubber. See U.S. Pat. No. 5,088,537. The TOS structure, the SWOT structure, or other structures may be used, but because of the greater ease with which retreading can be accomplished, the TOS structure is preferred.

The invention is further described in conjunction with the following examples which are to be considered illustrative rather than limiting, and in which all parts are parts by weight and all percentages are percentages by weight unless otherwise specified.

EXAMPLE A

An initial aqueous sodium silicate solution in the amount of 58.881 liters was established in a reactor. The initial aqueous sodium silicate solution contained about 2 weight percent $SiO_2$ and had an $SiO_2:Na_2O$ molar ratio of about 3.3. The initial aqueous sodium silicate solution was heated to 34° C. and over a period of 28 minutes and with agitation, 26.708 liters of about 2 weight percent aqueous sulfuric acid was added to the initial aqueous alkali metal silicate solution thereby to neutralize about 80 percent of the $Na_2O$ and to form a first reaction mixture. Over a period of 121 minutes, with agitation, and at a temperature of 80° C., a stream of 9.059 liters of additive aqueous sodium silicate solution containing about 13 weight percent $SiO_2$ and having an $SiO_2:Na_2O$ molar ratio of about 3.3, and a stream of 15.321 liters of about 4 weight percent aqueous sulfuric acid were added simultaneously to the first reaction mixture to form a second reaction mixture. The pH of the second reaction mixture was 9.1. A stream of about 8 liters of about 4 weight percent aqueous sulfuric acid was added to the second reaction mixture with agitation at a temperature of 80° C. to form a third reaction mixture having a pH of 4.5. The third reaction mixture was aged with agitation at 80° C. for 30 minutes. The aged third reaction mixture was split into two approximately equal portions. With agitation, 0.45 liter of additive aqueous sodium silicate solution containing about 13 weight percent $SiO_2$ and having an $SiO_2:Na_2O$ molar ratio of about 3.3 was added to one portion of the aged third reaction mixture at 80° C. to form a fourth reaction mixture having a pH of 8.5. A fifth reaction mixture was formed by adding to the fourth reaction mixture with agitation and at a temperature of 80° C., 2.271 liters of additive aqueous sodium silicate solution containing about 13 weight percent $SiO_2$ and having an $SiO_2:Na_2O$ molar ratio of about 3.3 and by adding 5.5 liters of about 4 weight percent aqueous sulfuric acid simultaneously to maintain the pH at about 8.5. The sequential additions to form the fourth and fifth reaction mixtures were made over a collective time period of 43 minutes. The fifth reaction mixture was aged with agitation at 80° C. for 45 minutes. With agitation, 1.5 liters of about 4 weight percent aqueous sulfuric acid was added to the aged fifth reaction mixture to form a sixth reaction mixture having a pH of 4.5. The sixth reaction mixture was aged with agitation at 80° C. for 60 minutes. The aged sixth reaction mixture was vacuum filtered using a series of Buchner funnels. Just before air could be pulled through each filter cake, the addition of 16 liters of water to the funnel was begun for the purpose of washing the filter cake. Air was briefly pulled through the washed filter cake. The wet filter cake contained 9.9 percent solids by weight. After being removed from the funnels, the wet filter cakes were stirred with a propeller type agitator to form a solid in liquid suspension. The suspension was dried in a Niro spray drier (inlet temperature about 360° C.; outlet temperature about 128° C.) to form a batch of dried reinforced precipitated silica. The product had a surface area of 333 $m^2/g$, a pore diameter at the maximum of the volume pore size distribution function of 9 nm, and a total intruded volume of 3.21 $cm^3/g$. The product was micronized in a fluid energy mill using compressed air as the working fluid.

EXAMPLE B

An initial aqueous sodium silicate solution in the amount of 340.7 liters was established in a reactor. The initial aqueous sodium silicate solution contained about 2 weight percent $SiO_2$ and had an $SiO_2:Na_2O$ molar ratio of about 3.3. The initial aqueous sodium silicate solution was heated to 37° C. and over a period of 30 minutes and with agitation, 2.449 liters of about 30 weight percent aqueous sulfuric acid and 137.426 liters of water were added as separate streams to the initial aqueous alkali metal silicate solution to neutralize about 80 percent of the $Na_2O$ and to form a first reaction mixture. The first reaction mixture was heated with agitation to 95° C. During the heat-up 74.8 liters of water was added. The diluted first reaction mixture was then aged with agitation at 95° C. for 60 minutes. Over a period of 120 minutes, with agitation, and at a temperature of 95° C., a stream of 52.41 liters of additive aqueous sodium silicate solution containing about 13 weight percent $SiO_2$ and having an $SiO_2:Na_2O$ molar ratio of about 3.3 and a stream of 9.449 liters of about 30 weight percent aqueous sulfuric acid were added to the aged diluted first reaction mixture to form a second reaction mixture. The pH of the second reaction mixture was 9.1. A stream of about 8 liters of about 30 weight percent aqueous sulfuric acid was added to the second reaction mixture with agitation at a temperature of 95° C. to form a third reaction mixture having a pH of 4.5. The third reaction mixture was aged with agitation at 95° C. for 30 minutes. With agitation, 6.57 liters of additive aqueous sodium silicate solution containing about 13 weight percent $SiO_2$ and having an $SiO_2:Na_2O$ molar ratio of about 3.3 was added to the aged third reaction mixture at 95° C. to form a fourth reaction mixture having a pH of 8.7. A fifth reaction mixture was formed by adding to the fourth reaction mixture with agitation and at a temperature of 95° C., 30.18 liters of additive aqueous sodium silicate solution containing about 13 weight percent $SiO_2$ and having an $SiO_2:Na_2O$ molar ratio of about 3.3, and by adding 6 liters of about 30 weight percent aqueous sulfuric acid as necessary to maintain the pH at about 8.7. The sequential additions to form the fourth and fifth reaction mixtures were made over a collective time period of 84 minutes. The fifth reaction mixture was aged with agitation at 95° C. for 45 minutes. With agitation, 3.5 liters of about 30 weight percent aqueous sulfuric acid was added to the aged fifth reaction mixture to form a sixth reaction mixture having a pH of 4.5. The sixth reaction mixture was aged with agitation for 60 minutes maintaining 95° C. and thereafter for about 900 minutes without temperature maintenance. The temperature at the conclusion of the 900 minute period was 66° C. The aged sixth reaction mixture was filtered in a filter press. The filter cake was washed with water until the conductivity of the filtrate had dropped to 90 micromhos/cm. The wet filter cake and added water were mixed with a Cowles blade to form a solid in liquid suspension containing 9.7 percent solids by weight. The suspension was dried in a Niro spray drier (inlet temperature about 360° C.; outlet temperature about 128° C.) to form the reinforced precipitated silica product. The product had a surface area of 232 $m^2/g$, a pore diameter at the maximum of the volume pore size distribution function of 14 nm, and a total intruded volume of 3.09 $cm^3/g$. The product was micronized in a fluid energy mill using compressed air as the working fluid.

EXAMPLE C

An initial aqueous sodium silicate solution in the amount of 41314 liters was established in a reactor. The initial aqueous sodium silicate solution contained about 2 weight percent $SiO_2$ and had an $SiO_2:Na_2O$ molar ratio of about 3.2. The initial aqueous sodium silicate solution was heated to 34° C. and over a period of 33 minutes and with agitation, 1086 liters of about 30 weight percent aqueous sulfuric acid and 11356 liters of water were added to the initial aqueous alkali metal silicate solution to neutralize about 80 percent of the $Na_2O$ and to form a first reaction mixture. The first reaction mixture was heated with agitation to 95° C. over a period of about 2 hours. The first reaction mixture was then aged with agitation at 95° C. for 65 minutes. A total of 2557 liters of water were added during the heating and aging periods. Over a period of 119 minutes, with agitation, and at a temperature of 95° C., a stream of 6314 liters of additive aqueous sodium silicate solution containing about 12.6 weight percent $SiO_2$ and having an $SiO_2:Na_2O$ molar ratio of about 3.2, a stream of 1124 liters of about 30 weight percent aqueous sulfuric acid, and a stream of 549 liters of water were added simultaneously to the first reaction mixture to form a second reaction mixture. The pH of the second reaction mixture was 9.6. A stream of about 777 liters of about 30 weight percent aqueous sulfuric acid and a stream of 117 liters of water were added to the second reaction mixture with agitation at a temperature of 95° C. to form a third reaction mixture having a pH of 4.5. The third reaction mixture was aged with agitation at 95° C. for 30 minutes during which period 46 liters of water was added. With agitation, water and 890 liters of additive aqueous sodium silicate solution containing about 12.6 weight percent $SiO_2$ and having an $SiO_2:Na_2O$ molar ratio of about 3.2 was added to the aged third reaction mixture at 95° C. to form a fourth reaction mixture having a pH of 8.5. A fifth reaction mixture was formed by adding to the fourth reaction mixture with agitation and at a temperature of 95° C., water and 3528 liters of additive aqueous sodium silicate solution containing about 12.6 weight percent $SiO_2$ and having an $SiO_2:Na_2O$ molar ratio of about 3.2 and by adding 846 liters of about 30 weight percent aqueous sulfuric acid as necessary to maintain the pH at about 8.5. The sequential additions to form the fourth and fifth reaction mixtures were made over a collective time period of 80 minutes. The fifth reaction mixture was aged with agitation at 95° C. for 45 minutes. With agitation, water and 259 liters of about 30 weight percent aqueous sulfuric acid were added to the aged fifth reaction mixture to form a sixth reaction mixture having a pH of 4.5. A total of 568 liters of water was added during formation of the fourth through the sixth reaction mixtures. The sixth reaction mixture was aged with agitation and without temperature maintenance for 653 minutes. The final temperature was 82° C. The aged sixth reaction mixture was divided into two batches of about 40504 liters and 39747 liters, respectively. Each batch was filtered in a filter press. The filter cakes were washed with water until the conductivity of the filtrate had dropped to about 5 micromhos/cm. A portion of the washed filter cakes from the first filter press batch was removed and set aside. The remainder of the washed filter cakes and added water were mixed with a Cowles blade to form a solid in liquid suspension containing 12 percent solids by weight. The suspension was dried in a Bowen spray drier (inlet temperature about 620° C. outlet temperature about 130° C.) to form the reinforced precipitated silica product. The product had a surface area of 236 $m^2/g$, a pore diameter at the maximum of the volume pore size distribution function of 15 nm, and a total intruded volume of 3.2 $cm^3/g$.

EXAMPLE D

An initial aqueous potassium silicate solution in the amount of 64.30 liters was established in a reactor. The initial aqueous potassium silicate solution contained about 2 weight percent $SiO_2$ and had an $SiO_2:K_2O$ molar ratio of about 3.05. The initial aqueous potassium silicate solution was heated to 38° C. and over a period of 29 minutes and with agitation, 27.20 liters of about 2 weight percent aqueous sulfuric acid was added to the initial aqueous alkali metal silicate solution thereby to neutralize about 80 percent of the $K_2O$ and to form a first reaction mixture. Over a period of 120 minutes, with agitation, and at a temperature of 94° C., a stream of 10.050 liters of additive aqueous potassium silicate solution containing about 13 weight percent $SiO_2$ and having an $SiO_2:K_2O$ molar ratio of about 3.05, and a stream of 15.60 liters of about 4 weight percent aqueous sulfuric acid were added simultaneously to the first reaction mixture to form a second reaction mixture. The pH of the second reaction mixture was 9.4. A stream of about 8 liters of about 4 weight percent aqueous sulfuric acid was added to the second reaction mixture with agitation at a temperature of 95° C. to form a third reaction mixture having a pH of 4.5. The third reaction mixture was aged with agitation at 95° C. for 30 minutes. With agitation, 1.1 liters of additive aqueous potassium silicate solution containing about 13 weight percent $SiO_2$ and having an $SiO_2:K_2O$ molar ratio of about 3.05 was added to the aged third reaction mixture at 94° C. to form a fourth reaction mixture having a pH of 8.5. A fifth reaction mixture was formed by adding to the fourth reaction mixture with agitation and at a temperature of 94° C., 6.933 liters of additive aqueous potassium silicate solution containing about 13 weight percent $SiO_2$ and having an $SiO_2:K_2O$ molar ratio of about 3.05 and by adding 9.5 liters of about 4 weight percent aqueous sulfuric acid simultaneously to maintain the pH at about 8.5. The sequential additions to form the fourth and fifth reaction mixtures were made over a collective time period of 83 minutes. The fifth reaction mixture was aged with agitation at 94° C. for 45 minutes. With agitation, 3.0 liters of about 4 weight percent aqueous sulfuric acid was added to the aged fifth reaction mixture to form a sixth reaction mixture having a pH of 4.5. The sixth reaction mixture was aged with agitation at 94° C. for 60 minutes. The aged sixth reaction mixture was vacuum filtered using a series of Buchner funnels. Just before air could be pulled through each filter cake, the addition of 12 liters of water to the funnel was begun for the purpose of washing the filter cake. Air was briefly pulled through the washed filter cake. The wet filter cake contained 14 percent solids by weight. After being removed from the funnels, the wet filter cakes were stirred with a propeller type agitator to form a solid in liquid suspension. The suspension was dried in a Niro spray drier (inlet temperature about 360° C.; outlet temperature about 128° C.) to form a batch of dried reinforced precipitated silica. The product had a surface area of 204 $m^2/g$, a pore diameter at the maximum of the volume pore size distribution function of 17.6 nm, and a total intruded volume of 4.81 $cm^3/g$. The product was micronized in a fluid energy mill using compressed air as the working fluid.

Table 1 shows physical test methods used to characterize uncured and cured tread rubber compositions

TABLE 1

Physical Test Methods

| Rubber Property | Test Method |
|---|---|
| Cure | ASTM D 2084-92 |
| Maximum Torque | |
| Minimum Torque | |
| $TS_2$ Scorch | |
| $T_{50}$ Cure | |
| $T_{90}$ Cure | |
| Hardness | ASTM D 2240-86 |
| Rebound | ISO 4662 |
| Tensile | ASTM D 412-87 |
| Elongation to Break | |
| Break Strength | |
| Modulus | |
| Molded Groove Tear Strength | ASTM D 2262-87, modified by excluding use of the fabric backing on the rubber specimen. |
| Damattia Cut Growth | ASTM D 813-87 |
| Dynamic Properties | ASTM D 2231-87 |
| Complex Modulus, G* | |
| Storage Modulus, G' | |
| Loss Modulus, G" | |

Predictive tire performance characteristics of cured tread rubber compositions can be made using laboratory data on cured rubber specimens if properly analyzed. Thus, using the Rheometrics RDAII dynamic mechanical spectrometer operated in the temperature sweeps mode, data is generated that can be predictive of tire product performance when analyzed using the equations reported in *Tire Science & Technology*, 18, 2–12 (1990), and summarized in Table 2, below.

TABLE 2

Predictive Tire Performance Equations

| Performance Characteristic | Relevant Dynamic Property | Temperature, °C. |
|---|---|---|
| Rolling Resistance | $G''/(G^*)^{0.8}$ | 60 |
| Wet Traction | $G''/(G^*)^{0.1}$ | 0 |
| Dry Traction | $G''/(G^*)^{1.8}$ | 0 |
| Ice Traction | $1/G^*$ | −30 |
| Cornering Coefficient | $G^*$ | 60 |

EXAMPLES 1–6

Table 3 shows the formula of a reinforcing carbon black-filled rubber composition useful in high performance passenger tire treads.

TABLE 3

| Reinforcing Carbon Black-Filled Tread Composition, phr | |
|---|---|
| Styrene-Butadiene Rubber | 80 |
| Butadiene Rubber | 20 |
| Reinforcing Carbon Black | Variable |
| Silica | Variable |
| Supported Silane Coupling Agent[1] | Variable |
| Processing Oil | 50 |
| Antidegradants | 5.5 |
| Stearic Acid | 2 |
| Sulfur | 0.75 |
| Zinc Oxide | 5 |
| Accelerator | 2.5 |

[1] 50% bis(3-(triethoxysilyl)propyl) tetrasulfide; 50% N-330 reinforcing carbon black.

The ingredients in Table 3 were admixed according to ASTM D 3182-87 in the order and in the amounts therein specified to form curable tire tread compositions. No coupling agent was used. Example 1 was made with 80 phr of N-299 reinforcing carbon black and 20 phr of reinforcing reinforced amorphous precipitated silica made according to U.S. Pat. No. 5,094,829 and having a BET nitrogen surface area of 223 $m^2/g$ and a pore diameter at the maximum of the volume pore size distribution function of 15.8 nm; Example 2 was made with 80 phr of N-299 reinforcing carbon black and 20 phr of reinforcing reinforced amorphous precipitated silica made according to U.S. Pat. No. 5,094,829 and having a BET nitrogen surface area of 256 $m^2/g$ and a pore diameter at the maximum of the volume pore size distribution function of 13.1 nm. Control 1 was made with 90 phr of N-299 reinforcing carbon black and no silica; Control 2 was made with 80 phr of N-299 reinforcing carbon black and 20 phr of amorphous precipitated silica having a BET nitrogen surface area of 150 $m^2/g$ and a pore diameter at the maximum of the volume pore size distribution function of 32.4 nm. Each of the curable compositions was formed into mold specimens and cured for 20 minutes at 150° C. Upon cooling, samples of the cured compositions were tested for various physical properties based upon the methods shown in Table 1. The results of physical testing of the samples are shown in Table 4. The results of dynamic analysis and the predictive performance equations shown in Table 2 are shown in Table 5.

TABLE 4

Relative Composition Physical Properties

| | Examples | | Controls | |
|---|---|---|---|---|
| Rubber Property | 1 | 2 | 1 | 2 |
| Torque, N · m | | | | |
| Minimum | 3.65 | 3.18 | 2.57 | 2.86 |
| Maximum | 12.29 | 11.53 | 14.34 | 12.24 |
| $TS_2$ Scorch, min | 6.51 | 6.50 | 6.81 | 7.12 |
| $T_{50}$ Cure, min | 8.34 | 8.30 | 8.30 | 8.89 |
| $T_{90}$ Cure, min | 14.34 | 14.07 | 11.50 | 13.74 |
| Break Strength, MPa | 10.18 | 9.81 | 17.92 | 12.16 |
| Elongation to Break, % | 706 | 736 | 621 | 672 |
| Modulus, MPa | | | | |
| @ 20% | 0.77 | 0.76 | 0.84 | 0.81 |
| @ 100% | 1.36 | 1.33 | 1.86 | 1.51 |
| @ 300% | 3.84 | 3.92 | 4.94 | 4.97 |

TABLE 4-continued

Relative Composition Physical Properties

| | Examples | | Controls | |
|---|---|---|---|---|
| Rubber Property | 1 | 2 | 1 | 2 |
| Molded Groove Tear Strength, kN/m | 32.6 | 33.0 | 21.5 | 27.3 |
| Demattia Cut Growth, mm @ 36 kc | 6.5 | 6.5 | 18.4 | 9.5 |

TABLE 5

Results of Analysis of Predictive Tire Performance Equations

| | Examples | | Controls | |
|---|---|---|---|---|
| Predicted Tire Property | 1 | 2 | 1 | 2 |
| Wet Traction, Dimensionless | 6.88 | 6.78 | 6.11 | 7.30 |
| Dry Traction, Dimensionless | 1.62 | 1.61 | 1.72 | 1.49 |
| Ice Traction, $(MPa)^{-1}$ | 1.21 | — | 1.32 | 1.26 |
| Rolling Resistance, Dimensionless | 3.71 | 3.73 | 3.50 | 3.73 |
| Cornering Coefficient, MPa | 1.39 | 1.31 | 1.17 | 1.08 |

Results in Tables 4 and 5 show that use of reinforcing reinforced amorphous precipitated silica made according to U.S. Pat. No. 5,094,829 serves to increase tear strength, to increase resistance to cut growth, to increase predicted tire wet traction, and to increase predicted tire cornering coefficient.

The ingredients in Table 3 were admixed according to ASTM D 3182-87 in the order and in the amounts therein specified to form curable tire tread compositions. No coupling agent was used. Example 3 was made with 82 phr of N-299 reinforcing carbon black and 20 phr of reinforcing reinforced amorphous precipitated silica made according to U.S. Pat. No. 5,094,829 and having a BET nitrogen surface area of 223 $m^2/g$ and a pore diameter at the maximum of the volume pore size distribution function of 15.8 nm; Example 4 was made with 82 phr of N-299 reinforcing carbon black and 20 phr of reinforcing reinforced amorphous precipitated silica made according to U.S. Pat. No. 5,094,829 and having a BET nitrogen surface area of 240 $m^2/g$ and a pore diameter at the maximum of the volume pore size distribution function of 14.7 nm. Control 3 was made with 90 phr of N-299 reinforcing carbon black and no silica; Control 4 was made with 82 phr of N-299 reinforcing carbon black and 20 phr of amorphous precipitated silica having a BET nitrogen surface area of 150 $m^2/g$ and a pore diameter at the maximum of the volume pore size distribution function of 32.4 nm. Each of the curable compositions was formed into mold specimens and cured for 20 minutes at 150° C. Upon cooling, samples of the cured compositions were tested for various physical properties based upon the methods shown in Table 1. The results of physical testing of the samples are shown in Table 6. The results of dynamic analysis and the predictive tire performance equations shown in Table 2 are shown in Table 7.

TABLE 6

Relative Compound Physical Properties

| | Examples | | Controls | |
|---|---|---|---|---|
| Rubber Property | 3 | 4 | 3 | 4 |
| Torque, N · m | | | | |
| Minimum | 3.90 | 3.89 | 2.58 | 2.68 |
| Maximum | 13.91 | 14.92 | 15.30 | 15.85 |
| $TS_2$ Scorch, min | 6.71 | 6.97 | 7.04 | 5.32 |
| $T_{50}$ Cure, min | 8.62 | 9.05 | 8.70 | 7.20 |
| $T_{90}$ Cure, min | 14.10 | 14.40 | 12.24 | 11.80 |
| Hardness, Shore A | | | | |
| @ 20° C. | 72 | 71 | 67 | 68 |
| @ 100° C. | 57 | 57 | 57 | 56 |
| Rebound, % | | | | |
| @ 23° C. | 24.8 | 27.0 | 28.8 | 27.4 |
| @ 100° C. | 38.0 | 37.6 | 42.6 | 43.6 |
| Break Strength, MPa | 13.54 | 12.98 | 16.40 | 15.59 |
| Elongation to Break, % | 560 | 564 | 516 | 534 |
| Modulus, MPa | | | | |
| @ 20% | 1.04 | 1.02 | 0.90 | 0.89 |
| @ 100% | 2.08 | 1.99 | 2.05 | 1.94 |
| @ 300% | 7.42 | 7.03 | 9.24 | 8.28 |
| Demattia Cut Growth, mm @ 36 kc | 11.4 | 8.1 | 20.4 | 13.7 |

TABLE 7

Results of Analysis of Predictive Tire Performance Equations

| | Examples | | Controls | |
|---|---|---|---|---|
| Predicted Tire Property | 3 | 4 | 3 | 4 |
| Wet Traction, Dimensionless | 8.53 | 8.63 | 7.17 | 7.63 |
| Dry Traction, Dimensionless | 1.37 | 1.34 | 1.37 | 1.31 |
| Ice Traction, $(MPa)^{-1}$ | 1.16 | 1.32 | 1.33 | 1.20 |
| Rolling Resistance, Dimensionless | 3.87 | 3.92 | 3.95 | 3.56 |
| Cornering Coefficient, MPa | 1.19 | 1.21 | 0.91 | 1.01 |

Results in Tables 6 and 7 show that use of reinforcing reinforced amorphous precipitated silica made according to U.S. Pat. No. 5,094,829 serves to increase resistance to cut growth, to increase predicted tire wet traction, and to increase predicted tire cornering coefficient.

The ingredients in Table 3 were admixed according to ASTM D 3182-87 in the order and in the amounts therein specified to form curable rubber compositions. Example 5 was made with 82 phr of N-299 reinforcing carbon black, 20 phr of reinforcing reinforced amorphous precipitated silica made according to U.S. Pat. No. 5,094,829 and having a BET nitrogen surface area of 223 $m^2/g$ and a pore diameter at the maximum of the volume pore size distribution function of 15.8 nm, and 4 phr of the supported silane coupling agent of Table 3; Example 6 was made with 82 phr of N-299 reinforcing carbon black, 20 phr of reinforcing reinforced amorphous precipitated silica made according to U.S. Pat. No. 5,094,829 and having a BET nitrogen surface area of 240 $m^2/g$ and a pore diameter at the maximum of the volume pore size distribution function of 14.7 nm, and 4 phr of the supported silane coupling agent of Table 3. Control 3 was made with 90 phr of N-299 reinforcing carbon black and no silica as previously described; Control 5 was made with 82 phr of N-299 reinforcing carbon black, 20 phr of amorphous precipitated silica having a BET nitrogen surface area of 150 $m^2/g$ and a pore diameter at the maximum of the volume pore size distribution function of 32.4 nm, and 4 phr of the supported silane coupling agent of Table 3. Each of the curable compositions was formed into mold specimens and cured for 20 minutes at 150° C. Upon cooling, samples of the cured compositions were tested for various physical properties based upon the methods shown in Table 1. The results of physical testing of the samples are shown in Table 8. The results of dynamic analysis and the predictive tire performance equations shown in Table 2 are shown in Table 9.

TABLE 8

Relative Compound Physical Properties

|  | Examples | | Controls | |
| --- | --- | --- | --- | --- |
| Rubber Property | 5 | 6 | 3 | 5 |
| Torque, N · m | | | | |
| Minimum | 4.08 | 3.74 | 2.58 | 3.26 |
| Maximum | 18.45 | 17.28 | 15.30 | 17.33 |
| TS$_2$ Scorch, min | 5.59 | 5.97 | 7.04 | 6.56 |
| T$_{50}$ Cure, min | 7.63 | 8.03 | 8.70 | 8.76 |
| T$_{90}$ Cure, min | 11.74 | 12.29 | 12.24 | 13.53 |
| Hardness, Shore A | | | | |
| @ 20° C. | 72 | 71 | 67 | 68 |
| @ 100  C. | 59 | 60 | 57 | 59 |
| Rebound, % | | | | |
| @ 23° C. | 28.2 | 27.4 | 28.8 | 28.2 |
| @ 100° C. | 43.8 | 41.4 | 42.6 | 42.6 |
| Break Strength, MPa | 17.11 | 15.98 | 16.40 | 16.57 |
| Elongation to Break, % | 502 | 486 | 516 | 483 |
| Modulus, MPa | | | | |
| @ 20% | 0.99 | 1.00 | 0.90 | 0.96 |
| @ 100% | 2.28 | 2.29 | 2.05 | 2.22 |
| @ 300% | 9.87 | 9.73 | 9.24 | 9.94 |
| Demattia Cut Growth, mm @ 36 kc | 17.7 | 17.2 | 20.4 | 18.8 |

TABLE 9

Results of Analysis of Predictive Tire Performance Equations

|  | Examples | | Controls | |
| --- | --- | --- | --- | --- |
| Predicted Tire Property | 5 | 6 | 3 | 5 |
| Wet Traction, Dimensionless | 9.49 | 9.37 | 7.17 | 8.90 |
| Dry Traction, Dimensionless | 1.37 | 1.44 | 1.37 | 1.31 |
| Ice Traction, (MPa)$^{-1}$ | 1.35 | 1.30 | 1.33 | 1.35 |
| Rolling Resistance, Dimensionless | 3.82 | 3.64 | 3.95 | 3.79 |
| Cornering Coefficient, MPa | 0.89 | 0.98 | 0.91 | 0.83 |

Results in Tables 8 and 9 show that use of reinforcing reinforced amorphous precipitated silica made according to U.S. Pat. No. 5,094,829 serves to increase resistance to cut growth and to increase predicted tire wet traction.

Results in Tables 6 and 8 show that use of reinforcing reinforced amorphous precipitated silica without coupling agent serves to decrease cut growth which is considered to be a beneficial effect.

Results in Tables 7 and 9 show that use of reinforcing reinforced amorphous precipitated silica without coupling agent increases predicted tire cornering coefficient which is considered to be a beneficial effect.

Although the present invention has been described with reference to specific details of certain embodiments thereof, it is not intended that such details should be regarded as limitations upon the scope of the invention except insofar as they are included in the accompanying claims.

We claim:

1. In a tire comprising:
   (a) a carcass having a crown; and
   (b) cured tread rubber composition adhered to said crown of said carcass;
   the improvement wherein said cured tread rubber composition comprises in combination:
   (c) organic rubber;
   (d) from 40 to 150 phr of reinforcing carbon black; and
   (e) reinforcing reinforced amorphous precipitated silica wherein said reinforcing reinforced amorphous precipitated silica has a surface area of from 160 to 340 m$^2$/g and a pore diameter at the maximum of the volume pore size distribution function of from 5 to 19 nm.

2. The tire of claim 1 wherein said reinforcing reinforced amorphous precipitated silica constitutes from 5 to 40 phr of said cured tread rubber composition.

3. The tire of claim 1 wherein said organic rubber constitutes from 20 to 70 percent by weight of said cured tread rubber composition.

4. The tire of claim 1 wherein:
   (a) said organic rubber constitutes from 30 to 65 percent by weight of said cured tread rubber composition;
   (b) said reinforcing carbon black constitutes from 45 to 120 phr of said cured tread rubber composition; and
   (c) said reinforcing reinforced amorphous precipitated silica constitutes from 7 to 30 phr of said cured tread rubber composition.

5. The tire of claim 1 wherein:
   (a) said organic rubber constitutes from 37 to 60 percent by weight of said cured tread rubber composition;
   (b) said reinforcing carbon black constitutes from 50 to 90 phr of said cured tread rubber composition; and
   (c) said reinforcing reinforced amorphous precipitated silica constitutes from 10 to 25 phr of said cured tread rubber composition.

6. The tire of claim 1 wherein said reinforcing reinforced amorphous precipitated silica has a surface area of from 180 to 340 m$^2$/g.

7. The tire of claim 1 wherein said reinforcing reinforced amorphous precipitated silica has a surface area of from 200 to 340 m$^2$/g.

8. The tire of claim 1 wherein said reinforcing reinforced amorphous precipitated silica has a pore diameter at the maximum of the volume pore size distribution function of from 8 to 18 nm.

9. The tire of claim 1 wherein said reinforcing reinforced amorphous precipitate silica has an average ultimate particle size of less than 0.1 micrometer.

10. The tire of claim 1 wherein said organic rubber comprises natural rubber, cis-1,4-polyisoprene, cis-1,4-polybutadiene, trans-1,4-polybutadiene, 1,2-polybutadiene, co-(styrene-butadiene), acrylonitrile-based rubber composition, isobutylene-based rubber composition or a mixture thereof.

11. The tire of claim 1 which is substantially free of silane coupling agent.

12. The tire of claim 1 which is substantially free of coupling agent.

13. The tire of claim 12 wherein said reinforcing reinforced amorphous precipitated silica constitutes from 5 to 40 phr of said cured tread rubber composition.

14. The tire of claim 12 wherein said organic rubber constitutes from 20 to 70 percent by weight of said cured tread rubber composition.

15. The tire of claim 12 wherein:

(a) said organic rubber constitutes from 30 to 65 percent by weight of said cured tread rubber composition;

(b) said reinforcing carbon black constitutes from 45 to 120 phr of said cured tread rubber composition; and (c) said reinforcing reinforced amorphous precipitated silica constitutes from 7 to 30 phr of said cured tread rubber composition.

16. The tire of claim 12 wherein:

said organic rubber constitutes from 37 to 60 percent by weight of said cured tread rubber composition;

(b) said reinforcing carbon black constitutes from 50 to 90 phr of said cured tread rubber composition; and (c) said reinforcing reinforced amorphous precipitated silica constitutes from 10 to 25 phr of said cured tread rubber composition.

17. The tire of claim 12 wherein said reinforcing reinforced amorphous precipitated silica has a surface area of from 180 to 340 $m^2/g$.

18. The tire of claim 12 wherein said reinforcing reinforced amorphous precipitated silica has a surface area of from 200 to 340 $m^2/g$.

19. The tire of claim 12 wherein said reinforcing reinforced amorphous precipitated silica has a pore diameter at the maximum of the volume pore size distribution function of from 8 to 18 nm.

20. The tire of claim 12 wherein said reinforcing reinforced amorphous precipitated silica has an average ultimate particle size of less than 0.1 micrometer.

21. The tire of claim 12 wherein said organic rubber comprises natural rubber, cis-1,4-polyisoprene, cis-1,4-polybutadiene, trans-1,4-polybutadiene, 1,2-polybutadiene, co-(styrene-butadiene), acrylonitrile-based rubber composition, isobutylene-based rubber composition or a mixture thereof.

\* \* \* \* \*